Feb. 17, 1970   M. MARENGHI ET AL   3,495,813
GAS-LIQUID CONTACT APPARATUS
Filed Dec. 26, 1967   2 Sheets-Sheet 2

INVENTORS
MICHAEL MARENGHI
BARRY JAMES TAYLOR
BY
Robert S. Dunham
ATTORNEY

United States Patent Office 3,495,813
Patented Feb. 17, 1970

3,495,813
GAS-LIQUID CONTACT APPARATUS
Michael Marenghi and Barry James Taylor, Arvida, Lapointe County, Quebec, Canada, assignors to Alcan Research and Development, Limited, Ottawa, Ontario, Canada, a corporation of Canada
Filed Dec. 26, 1967, Ser. No. 693,284
Int. Cl. C22b 9/12, 21/06; B08b 3/04
U.S. Cl. 266—8                                8 Claims

ABSTRACT OF THE DISCLOSURE

A decomposer chamber for use in the subhalide process for the refining of aluminum containing molten aluminum with a gas space thereover and aluminum monohalide gas inlet and egress openings into the chamber gas space, having one or more helical screw-lifts extending above and below the liquid level in the chamber, for continuous rotation to draw liquid upward into the gas space and then scatter it across the gas space in relatively small droplets relatively uniformly distributed throughout, the screw-lifts each having at least one helical passageway rising upwardly therealong and totally enclosed except for a plurality of orifices therein adapted to allow the emission of liquid therefrom in relatively fine streamlets laterally impelled by centrifugal force on the liquid in the helical rotating passageway. The totally enclosed nature of the helical passageway or passageways together with the multiplicity of orifices in the peripheral surface thereof, provides a great improvement over prior art structures in several respects directly pertinent to gas-liquid contact efficiency, particularly the production of very fine droplets and in the uniform distribution of droplets throughout the gas space and especially close to the screw-lifts themselves.

BACKGROUND OF THE INVENTION

In many processing situations a molten metal or salt or a more ordinary liquid must be intermittently contacted with a stream of gas either for the purpose of cooling the gas or liquid with the other, or for absorbing the gas into the liquid. The problem common to these situations is the need to achieve very large area of contact between liquid and gas in a relatively compact apparatus. A common form of solution to this classic problem has been to spray the liquid, generally by mechanical agitation, into the vapor space containing the gas. In U.S. Pat 3,311,363 to N. W. F. Phillips et al., issued Mar. 28, 1967, and assigned to a common assignee with the present invention, there is shown an important advance in the art of gas-liquid contact apparatus, and particularly in the art of contact of molten high temperature liquids with higher temperature gases.

There is shown in that patent employment of a helical screw-lift which when rotated lifts the molten liquid above the liquid level and into the gas space, and then releases it tangentially throughout the gas space by centrifugal force upon the liquid causing it to spill over the open helical channel or trough and be emitted therefrom laterally. The apparatus of that patent constitutes an important advance in the art of gas-liquid contact techniques, but because there is always room for improvement in the efficiency of gas-liquid contact, no apparatus can be the final solution to the problem. That is to say, an apparatus which can produce finer droplets and distribute them more evenly than that of the aforesaid patent, while preserving the other desirable characteristics of that patent, will constitute an advance thereover. The present invention is the result of attempts at coming still closer to the never-attainable ideal of maximum gas-liquid contact surface so that the most efficient process dependent thereon, e.g. absorption or heat exchange or the like, is more closely approached.

SUMMARY OF THE INVENTION

For use in a chamber containing liquid with a gas space thereover and gas inlet and egress openings into the chamber gas space, having one or more helical screw-lifts extending above and below the liquid level in the chamber, for continuous rotation to draw liquid upward into the gas space and then scatter it across the gas space in relatively small droplets relatively uniformly distributed throughout, an improved screw-lift comprising at least one helical passageway rising upwardly therealong and totally enclosed except for a plurality of orifices therein adapted to allow the emission of liquid therefrom in relatively fine streamlets laterally compelled by centrifugal force of the liquid in the helical rotating passageway. The totally enclosed nature of the helical passageway or passageways together with the multiplicity of orifices in the peripheral surface thereof, provides a great improvement over prior art structures in several respects directly pertinent to gas-liquid contact efficiency, particularly the production of very fine droplets and in the uniform distribution of droplets throughout the gas space and essentially close to the screw-lifts themselves.

BRIEF DESCRIPTION OF THE FIGURES

The invention is shown in the accompanying drawings in one illustrative, but not limiting embodiment thereof, in which.

DETAILED DESCRIPTION OF THE INVENTION

Figure 1:
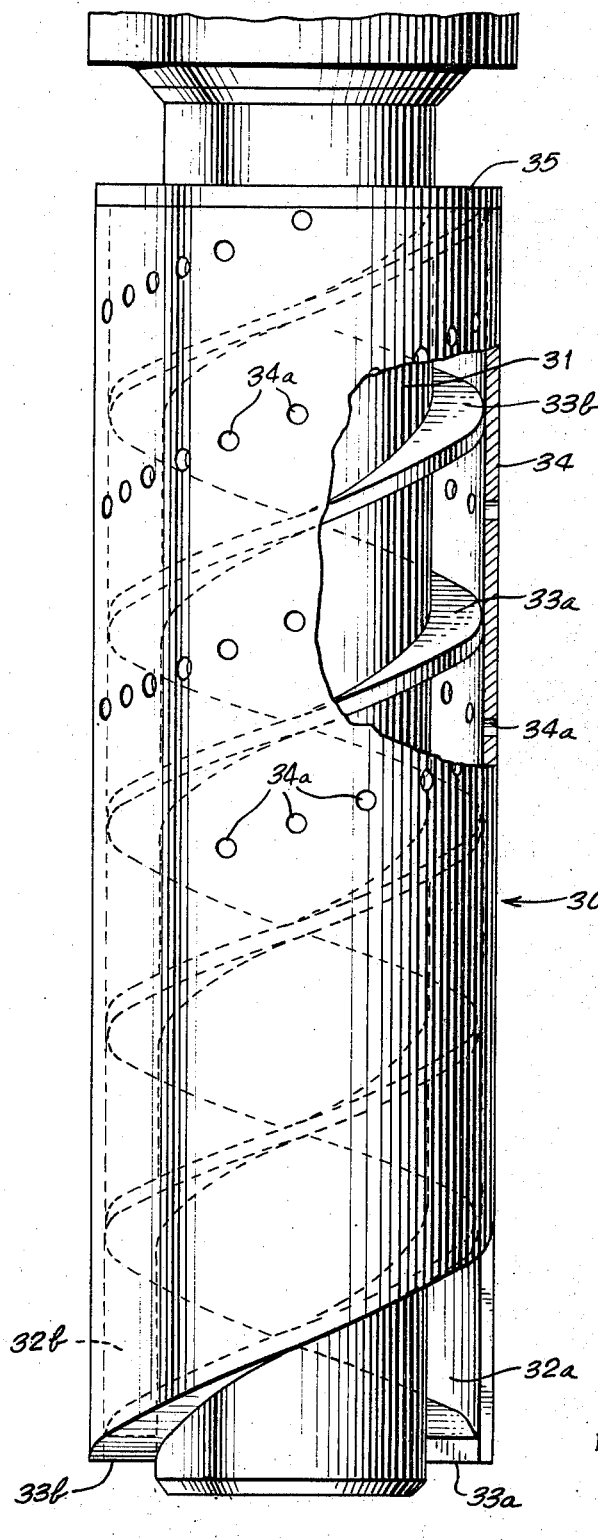
FIG. 1 is a perspective view of a screw-lift according to the invention partially broken away to show details thereof.

Referring now to the drawings, there is shown the improved screw-lifts according to the invention embodied and employed in a decomposer apparatus for use in the subhalide process for the refining of aluminum. Embodiment and employment in numerous other forms of gas-liquid contact apparatus, wherein a gas-space overlies a liquid, is equally advantageous with the present invention. The decomposer within which the screw-lifts according to the present invention are deployed is identical to that shown in U.S. Patent 3,311,363 to N. W. F. Phillips et al. (hereinafter termed the Phillips patent), issued Mar. 28, 1967, and assigned to a common assignee with the present invention.

Figure 2:
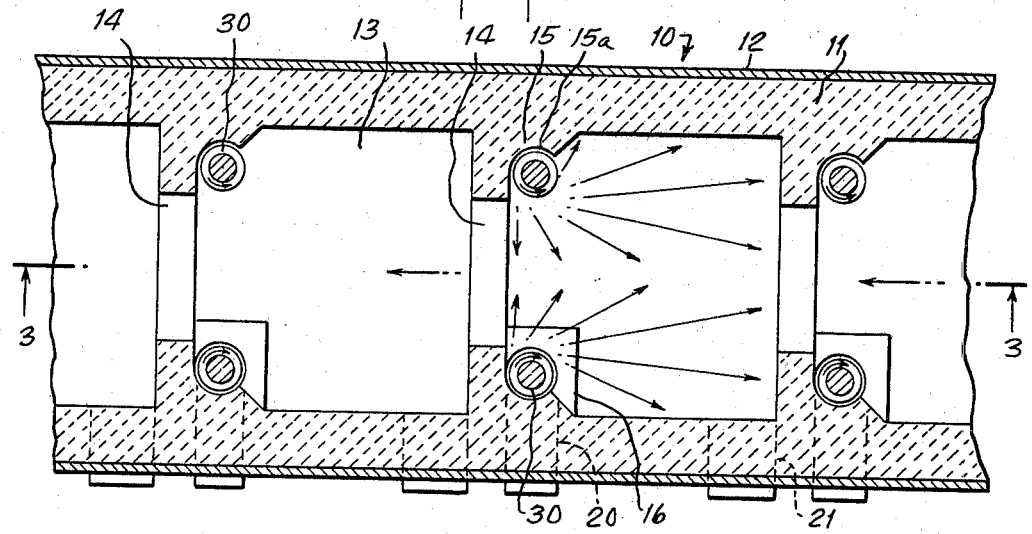
FIG. 2 is a sectioned plan view of a portion of a gas-liquid contact apparatus according to the invention employing a plurality of screw-lifts such as that shown in FIG. 1 but reduced in scale therefrom for purposes of illustration.
Figure 3:
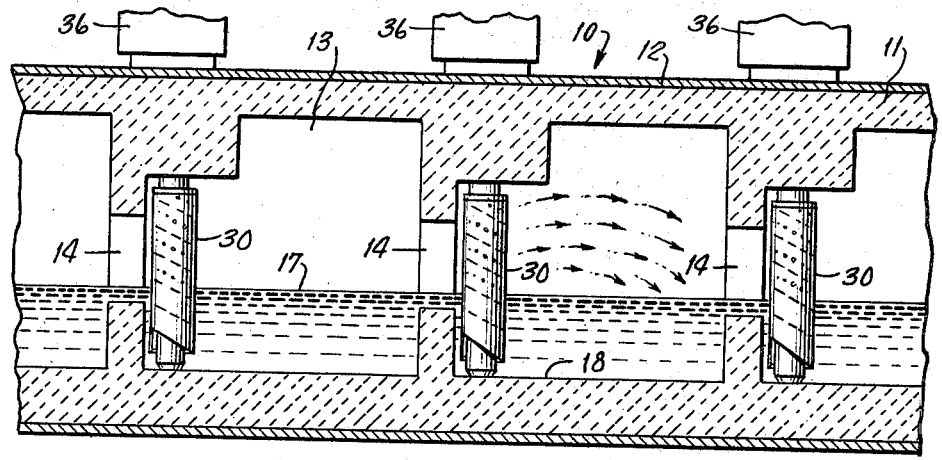
FIG. 3 is a section view of the unsectioned apparatus of FIG. 2 viewed along plane 3—3 therein.

A decomposer indicated generally at 10 in FIGS. 2 and 3 comprises a refractory material structure 11 preferably, but not necessarily, manufactured from refractory bricks and having a metallic outer shell 12. The interior of decomposer 10 constitutes a plurality of chambers 13, said chambers being serially interconnected by a plurality of passageways 14. The general purpose of decomposer 10 is to contact aluminum monohalide gas at an elevated temperature, with molten aluminum in each of chambers 13, the aluminum monohalide gas traversing the chambers in serial fashion by means of passageways 14, so that the gas may be cooled by the liquid metal and thus decomposed into aluminum and aluminum trihalide. Within each of chambers 13, in order to effect this general purpose, must be situated means for contacting a great area of the molten aluminum with the traversing gas, which contains the monohalide, usually in admixture with a substantial proportion of unconverted trihalide.

In the aforesaid Phillips patent, helical screw-lifts are employed having a helical lateral opening along their outer cylindrical surface, so that molten metal is both moved upwardly by the helical screw and emitted laterally out of the helical opening. While that form of screw-lift constituted an important advance over prior art methods of contacting liquids and gases, in that a uniform and dense spray is continually produced to occupy the gas volume concerned, thereby affording liquid-gas contact having much greater contact surface area and resultant efficiency of heat exchange than anything theretofore known, the improved screw-lift according to the present invention is a significant advance over that shown in the Phillips patent in all the factors tending toward improved surface contact efficiency in gas-liquid contact apparatus.

Referring now to FIG. 1, it will be seen that the body of screw-lift 30 comprises a central torque shaft 31, with a pair of preferably integrally formed helical passageways 32a and 32b concentric therewith. Passageways 32a and 32b form a double helix having the same sense. Passageways 32a and 32b each have a bottom wall 33a, 33b respectively, which winds helically up the length of shaft 31. A cylindrical side wall 34 is spaced outwardly from shaft 31, to totally enclose each of passageways 32a, 32b throughout their rise along shaft 31 except as hereinafter explained. Thus, each passageway, e.g. passageway 32a, has a completely enclosed cross-section, e.g. passageway 32a is enclosed by a bottom portion constituting bottom wall 33a, inner and outer side portions constituting shaft 31 and side wall 34, and an upper portion constituting the bottom wall 33b of passageway 32b. Similarly, passageway 32b is enclosed by a bottom portion constituting bottom wall 33b, side portions constituting shaft 31 and side wall 34, and an upper portion constituting the bottom wall 33a of passageway 32. The top of passageways 32a, 32b is closed by a panel 35. The screw-lift 30 may be fabricated in any material compatible with the liquid concerned. When using molten aluminum, the preferred material is graphite.

The exception to total enclosure of the upper portions of passageways 32a, 32b is that the side wall 34 contains a plurality of orifices 34a, which generally, but not necessarily, follow a helical path along each of passageways 32a, 32b, preferably throughout the upper portion of the screw-lift 30 disposed above the level of the liquid in which the screw-lift is partially immersed. The orifices 34a can be of greater or lesser cross-sectional area, can be varied in number and density along the helical passageways 32a, 32b, and can in other ways vary in placement in side wall 34 so long as they penetrate into the interior of passageways 32a, 32b. As will presently be understood, these variations allow closer control of and greater efficiency in gas-liquid contact.

When shaft 31 is rotated in the clockwise direction while the lower portion is immersed in a liquid, the liquid will rise in the helical passageways 32a, 32b, and since trapped there, will be expelled through the orifices 34a initially as streamlets of liquid into any free-space surrounding the screw-lift 30. The totally enclosed helical passageways 32a, 32b, with orifices 34a, according to the present invention, provide high velocity, fine liquid streamlets, that break up more rapidly into droplets, and into finer droplets, so that a much finer spray, much more evenly distributed throughout the gas-space, and especially close to the screw-lifts, is produced. Thus, the present screw-lifts provide significantly improved gas-liquid contact and heat exchange efficiency, as compared to the prior art, including the Phillips patent.

Before further explaining the improved action of the screw-lifts 30 according to the present invention, their setting in the decomposer 10 must be understood so that certain advantages of the screw-lifts 30 can be more fully grasped.

Referring now again to the decomposer 10 shown in FIGS. 2 and 3, the direction of aluminum monohalide gas flow is from right to left in the apparatus as shown, as indicated by the double-headed arrows therein. Accordingly at the leftmost portion of each chamber 13, immediately adjacent the sides of passageway 14, is a pair of screw-lifts 30. Surrounding each screw-lift 30 for a substantial portion of the periphery thereof, is a baffle portion 15 of refractory wall 11. The baffle portion 15 is shaped with a circular concave portion 15a adapted, in the example embodiment shown, to encircle the periphery of screw-lift 30 for about 135° of arc thereof. The said concave portion 15a is arranged relative to chamber 13 so that a radius of portion 15a at the mid-point of said 135° of arc points approximately diagonally across chamber 13. The concave portion 15a may extend the height of chamber 13, as may the shaft 31 of the screw-lift 30 nested therein. It is essential only that the portion 15a extend throughout the portion of the chamber constituting the vapor space, that is, above the liquid level 17.

The screw-lift 30 fits closely into the concave portion 15a, but without touching. Concave portion 15a thus conforms closely to a limited arcuate portion of the outline of screw-lift 30, the limits of the arcuate portion being generally defined as extending from a point on screw-lift 30 whose tangent points directly across the opening of passageway 14, to a point whose tangent points in the general direction of the gas inlet to the chamber, that is, the opposite end of the chamber from the end of adjacent screw-lifts 30. Preferably, the passageways 32a, 32b do not extend all the way down to the bottom 18, although of course they extend appreciably below liquid level 17.

As is best shown in FIG. 2 a shroud 16 surrounds one of the screw-lifts 30 in each of chambers 13. The shroud 16 preferably extends from appreciably below the molten liquid level 17 of the chamber (i.e. appreciably below the lower portion of passageway 14) completely down to the floor 18 of the chamber 13. Thus all the portion of screw-lift 30 above liquid level 17 is unshrouded by shroud 16, and only a portion (e.g. one-half) of the screw-lift 30 below the liquid level 17 is unshrouded. The shroud 16 is fabricated in a suitably resistant material relative to the nature of the molten liquid contained in chamber 13 in which it is immersed, in the case of molten aluminum, the material consequently is preferably refractory in nature. The shroud 16 is affixed to the refractory walls 11 immediately adjacent screw-lift 30, so that a large portion of the screw-lift 30 is confined within the embrace of shroud 16, and so that liquid may of course be exchanged between the shroud-embraced portion of chamber 13 and the main portion of chamber 13.

Leading in through wall 11 adjacent that screw-lift 30 having shroud 16 associated therewith, is entrance passageway 30, shown partially in phantom outline in FIG. 2, and partially in full outline therein. This passageway 20 leads from a cooling well (not shown) wherein molten aluminum is by any appropriate technique, cooled in temperature. The cooled molten aluminum is lead in via passageway 20 into the portion of chamber 13 embraced by shroud 16. At the far end of chamber 13 from the end containing screw-lifts 30, is a second or outlet passageway 21, also shown partially in phantom and partially in full outline in FIG. 2. Passageway 21 leads the molten contents of chamber 13 from a depth therein appreciably below the surface thereof, to the aforesaid cooling well for cooling and return to chamber 13 via passageway 20.

Referring now to the detailed structure of screw-lift 30 shown in FIG. 1, in conjunction with its employment in the decomposer of FIGS. 2 and 3, when the right-handed screw-lift 30 as illustrated is rotated in a clockwise fashion, liquid is forced up helical passageways 32a and 32b, and when this liquid is raised along shaft 31 above liquid surface 17 in the decomposer 10, centrifugal force on the liquid contained in passageways 32a, 32b throws it outward against side wall 34, causing the liquid to be emitted from orifices 34a therein. The closely conforming (but not touching) circular concave portions 15a of refractory wall 11 prevent tangential spraying from orifices 34a over the aforesaid 135° of arc of screw-lifts 30, thus resulting in tangential spray in the direction shown by the single-headed arrows within chamber 13 in FIG. 2. As represented by the single-headed arrows some spray is released tangentially on the point on the periphery of screw-lift 30 just past the end of the aforesaid approximately 135° arc of concave portion 15a so that such spray travels laterally across chamber 13 toward the opposed screw-lift 30. The effect created by the opposed spray from the pair of screw-lifts 30 in each chamber 13 is to create a dense curtain of spray across the opening of passageway 14 to the next chamber 13. Spray released at points further moved peripherally from the first mentioned points travels in directions as indicated by the other single-headed arrows in chamber 13 in FIG. 2 so that progressively released spray travels in a broad arc of directions a great deal of which is nearly or essentially counter-current to the flow of gas indicated by the double-headed arrows.

The screw-lift 30 according to the present invention provides superior gas-liquid contact as compared to the open helical form of screw-lift shown in the Phillips patent for the following reasons. The open screw-lift of the Phillips patent splashes liquid tangentially at a relatively low velocity and in sheets which must travel an appreciable distance before breaking up into mostly large droplets, both due to the open nature of the helical screw-lift structure. Accordingly, that prior art open helical screw-lift, while it fills the entire free-space with splashing liquid, does not present the degree of contact area presented by the screw-lift 30 according to the present invention, and especially does not provide the degree of contact area throughout the entire volume as does the present screw-lift 30.

That is to say, the screw-lift 30 according to the present invention in producing very narrow streamlets of liquid from orifices 34a, which necessarily travel at a considerably higher velocity than the splashing sheets of liquid from the open helix of the Phillips patent, provides finer, more uniformly distributed droplets in the gas space. Thus, because of their narrow cross-section, these streamlets from orifices 34a break up much more rapidly into droplets, and break up into smaller droplets, than does the liquid splashing from the screw-lift of the aforesaid patent. Consequently, the screw-lift 30 according to the present invention not only produces droplets which are on the average very much smaller, and thereby in the aggregate of very much greater contact area than heretofore, but also these droplets occur quite close to the screw-lift 30 itself within the decomposer 10, so that a greater volume of free-space surrounding the screw-lifts 30 is available for gas contact with the aforesaid finer droplets.

A very important aspect of the present invention resides in the fact that the orifices 34a can be distributed in any desired pattern along the portion of screw-lift 30 which rise above liquid level 17, depending upon the desired spray pattern. Also the diameter of orifices 34a, which need not be uniform from orifice to orifice, can be varied in order to produce streams of greater or lesser volumetric flow rate to help control the distribution of fine droplets so as to take advantage of the entire free-space for gas-liquid contact. Increased or decreased rotational speed of screw-lift 30 propels the droplets further or nearer, to also help control the distribution of droplets. In the Phillips patent such close control of distribution was not present.

Also, and particularly when a material such as graphite is employed to fabricate the screw-lifts 30, the provision of side wall 34 enclosing the entire structure adds very considerably to the structural integrity, and accordingly the service life, thereof. This is yet another advantage of the present construction over the prior art.

Also, the screw-lift 30 according to the present invention can typically be operated at an appreciably lower optimum r.p.m. than the Phillips patent open screw-lift (because of greater droplet distribution), e.g. 450–550 r.p.m. as opposed to 600–700 r.p.m., and again particularly when a graphite or similar refractory screw-lift is employed, the lower r.p.m. is conductive of longer service life.

In operation, the decomposer 10 functions as follows. A high temperature gas stream containing aluminum monohalide gas is led into a first stage chamber (not shown) and subsequently to succeeding identical stages 13 shown in FIG. 2. Since the operation in each stage 13 is identical, only entrance into one example chamber 13 and exit therefrom by the aluminum monohalide gas will be described.

Hot aluminum monohalide gas enters through a passageway 14 at the end of chamber 13 furthest from screw-lifts 30 and is met by essentially counter-current relatively cool sprayed molten metal. The gas is somewhat cooled thereby and is somewhat decomposed to yield its aluminum in this portion of chamber 13. As the gas travels further through chamber 13 toward the immediate vicinity of screw-lifts 30 the direction of spray generally changes from counter-current to cross-current and the spray becomes more intense and concentrated. The effect of this latter is to scrub the gas thoroughly and expose all portions thereof to metallic contact. It is an important feature of the present invention that the spray droplets are very fine and very uniformly distributed even within this portion of the chamber, i.e. the portion in the immediate vicinity of screw-lifts 30 and toward the exit from chamber 13. It will be appreciated that fine spray and even distribution thereof is even more important in this portion of the chamber than in the entrance portion of the chamber, because the major portion of the heat exchange and decomposition has already taken place, and accordingly a very high efficiency of gas-liquid contact is required at this latter portion of the chamber in order to deal efficiency with the gas at that stage.

The traverse of the entire chamber is thus a combination of counter-current contact and intense scrubbing with sprayed molten metal so that the temperature of the gas exiting from the same chamber 13 by the passageway 14 adjacent screw-lifts 30 is virtually the same as the temperature of the molten spray or the molten bath therein. Not all of the gas will be decomposed to aluminum and aluminum trihalide within any given chamber 13, although such an effect could be designed into the equipment if a single stage operation was completely necessary. When the enclosed screw-lifts 30 according to the present invention are employed however, a smaller number of stages is required than when the Phillips patent screw-lift is employed, all other variables being equal. This is so because of the aforesaid greater efficiency of gas-liquid contact throughout, and especially at the latter portion of the traverse of the gas through the chamber 13 when the gas comes closer to the screw-lifts 30. This is yet another advantage of the practice of the enclosed screw-lifts 30 according to the present invention.

Generally, the temperature of the molten bath in each of successive chambers 13 will be lower, and consequently the temperature of the gas exiting from the corresponding chambers will also be successively lower. Each chamber is therefore to some extent thermodynamically independent of the others, and in equilibrium with its own particular temperature range of gas flow. Within such a multi-stage operation decomposition will occur in one or more of the successive stages and yield the aluminum values therein, or may occur in all stages because of non-uniformities in gas cooling within the gas flow in any given chamber. In any event the overall effect is to efficiently and effectively contact the molten metal with the traversing gas within one or more stages 13 so as to decompose the aluminum monochloride to aluminum and aluminum trichloride.

The invention has been described with respect to an illustrative embodiment, wherein molten aluminum is sprayed into a free-space traversed by aluminum monohalide gas. It is to be clearly understood that the principles of the invention are equally applicable to any gas-liquid contact situation wherein it is desirable to form a very uniform, small droplet spray throughout the interior of a free-space occupied by, or particularly traversed by, a gas to be contacted by the liquid. As will be apparent to those skilled in the art changes may be made in the precise form and arrangement of the parts without departing from the spirit and scope of the invention. All such modifications are contemplated within the scope of the appended claims.

What is claimed is:

1. In apparatus for mixing and contacting a gas with a liquid, including a chamber having a lower liquid region adapted to contain said liquid and an upper gas region adapted to accommodate said gas over the surface of said liquid, and liquid spraying means for continuously spraying said aluminum liquid throughout the gas region of said chamber; in combination therewith, the improvement in said spraying means for spraying fine droplets relatively uniformly distributed throughout said gas region, comprising:
    (a) a vertically disposed shaft extending downward into said aluminum liquid region and upward through said gas region, and mounted for powered rotation about the vertical axis thereof; and
    (b) at least one helical passageway secured to the outer surface of said shaft and extending from the lower portion thereof within said aluminum liquid region upwardly along said shaft through said gas region, being totally enclosed except for
        (i) an open end of said passageway located within said aluminum liquid region, adapted to admit a stream of aluminum liquid into said passageway when said shaft is rotated so that said open end advances in the aluminum liquid of said liquid region, and
        (ii) a plurality of orifices in the lateral wall of said passageway distributed along the helical path thereof throughout said gas region for emission of aluminum liquid in lateral streamlets from said passageway under centrifugal force developed due to the rotation of said passageway with said shaft.

2. An apparatus according to claim 1 further wherein two such helical passageways are secured to said shaft, having the same sense, and having their respective open ends spaced one from the other around the periphery of the lower portion of said shaft.

3. An apparatus according to claim 1, wherein the diameter of each of said orifices and the distribution of the plurality of orifices is such as to provide streamlets of liquid of varied volumetric flow rates at varied elevations within said gas region, so as to fill the entire gas region with fine droplets.

4. An apparatus according to claim 1, wherein said chamber includes gas inlet and outlet means to provide traversal of gas through said gas region, and wherein said spraying means is located adjacent said gas outlet means, and further including a baffle located immediately adjacent to said spraying means to direct the spray emitted therefrom between a direction generally toward said inlet means and a direction generally perpendicular to the direction of traversal of said gas within said chamber.

5. In apparatus for mixing and contacting a relatively hot traversing aluminum monohalide gas with a relatively cool molten aluminum liquid repository so as to cool said gas until decomposition into aluminum metal and aluminum trihalide is achieved, including at least one chamber having a lower liquid region adapted to contain said molten aluminum liquid and an upper gas region adapted to accommodate said traversing aluminum monohalide gas over the surface of said liquid, gas inlet means and gas outlet means to provide traversal of said monohalide gas through said gas region, and liquid spraying means for continuously spraying said aluminum liquid throughout the gas region of said chamber; in combination therewith, the improvement in said spraying means for spraying fine droplets relatively uniformly distributed throughout said gas region, comprising:
    (a) a vertically disposed shaft extending downward into said aluminum liquid region and upward through said gas region, and mounted for powered rotation about the vertical axis thereof; and
    (b) at least one helical passageway secured to the outer surface of said shaft and extending from the lower portion thereof within said aluminum liquid region upwardly along said shaft through said gas region, being totally enclosed except for
        (i) an open end of said passageway located within said aluminum liquid region, adapted to admit a stream of aluminum liquid into said passageway when said shaft is rotated so that said open end advances in the aluminum liquid of said liquid region, and
        (ii) a plurality of orifices in the lateral wall of said passageway distributed along the helical path thereof throughout said gas region for emission of aluminum liquid in lateral streamlets from said passageway under centrifugal force developed due to the rotation of said passageway with said shaft.

6. A screw-lift for lifting liquid from a lower liquid region into an upper region and spraying the liquid in fine droplets laterally within said gas region, comprising:
    (a) a shaft mountable vertically for powered rotation;
    (b) at least one helical passageway secured to the outer surface of said shaft and extending therealong, being totally enclosed except for
        (i) an open end of said passageway;
        (ii) a plurality of orifices in the lateral wall of said passageway distributed along the helical path thereof throughout the portion thereof remote from said open end and corresponding to the portion thereof adapted to lie within said gas region for emission of aluminum liquid in lateral streamlets from said passageway under centrifugal force developed due to the rotation of said passageway with said shaft.

7. An apparatus according to claim 6 further wherein two such helical passageways are secured to said shaft, having the same sense, and having their respective open ends spaced one from the other around the periphery of said shaft.

8. An apparatus according to claim 6, wherein the diameter of each of said orifices and the distribution of the plurality of orifices is such as to provide streamlets of liquid of varied volumetric flow rates at varied elevations within said gas region, so as to fill the entire gas region with fine droplets.

References Cited

UNITED STATES PATENTS

| | | | |
|---|---|---|---|
| 935,501 | 9/1909 | Hershey et al. | 261—91 |
| 2,605,091 | 7/1952 | Socke. | |
| 3,351,461 | 11/1967 | Southam | 75—68 |

J. SPENCER OVERHOLSER, Primary Examiner

JOHN S. BROWN, Assistant Examiner

U.S. Cl. X.R.

23—294; 55—72, 86, 94, 230; 75—68; 134—132; 261—91; 266—34

PO-1050
(5/69)

UNITED STATES PATENT OFFICE
CERTIFICATE OF CORRECTION

Patent No. 3,495,813      Dated February 17, 1970

Inventor(s) MICHAEL MARENGHI and BARRY JAMES TAYLOR

It is certified that error appears in the above-identified patent and that said Letters Patent are hereby corrected as shown below:

Column 2, line 16, for "compelled" read --impelled--; Column 4, line 55, for "30" read --20--; Column 5, line 18, for "moved" read --removed--; Column 6, line 43, for "efficiency" read --efficiently--; and Column 8, line 36 after "upper" insert --gas--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents